May 18, 1937.   S. A. ESKILSON ET AL   2,080,563
ARRANGEMENT FOR FIXATION OF THE EDGES OF A JOINT TO BE WELDED
Filed March 15, 1935    3 Sheets-Sheet 1
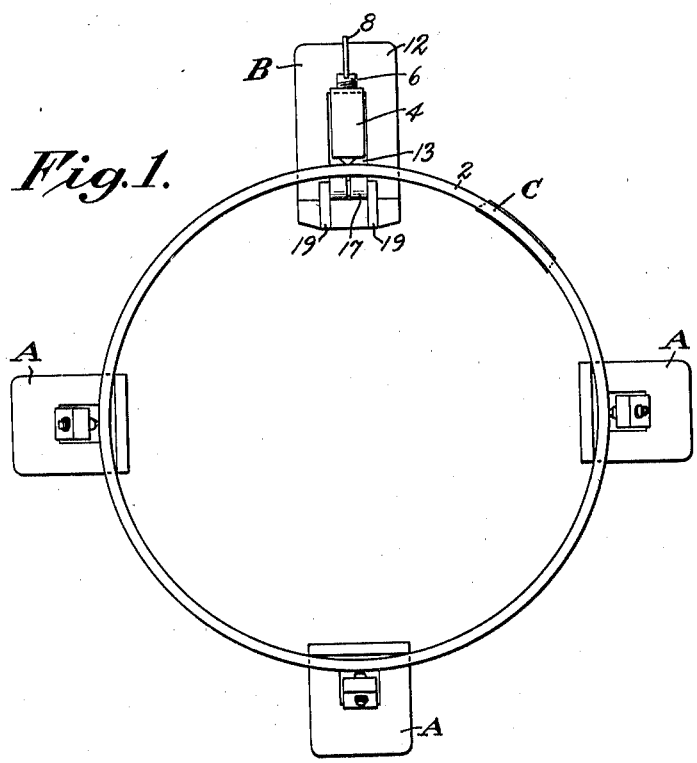
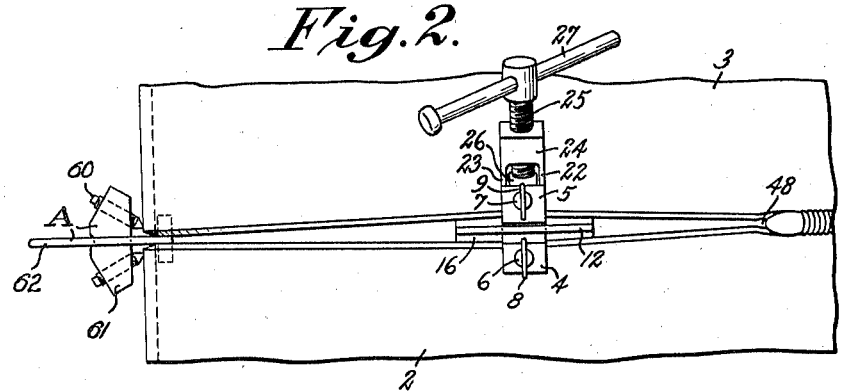

May 18, 1937.   S. A. ESKILSON ET AL   2,080,563
ARRANGEMENT FOR FIXATION OF THE EDGES OF A JOINT TO BE WELDED
Filed March 15, 1935   3 Sheets-Sheet 2
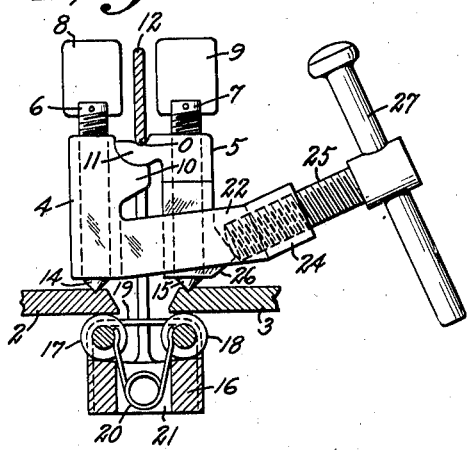
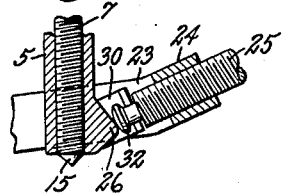
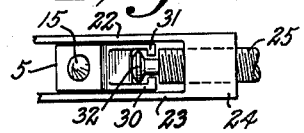
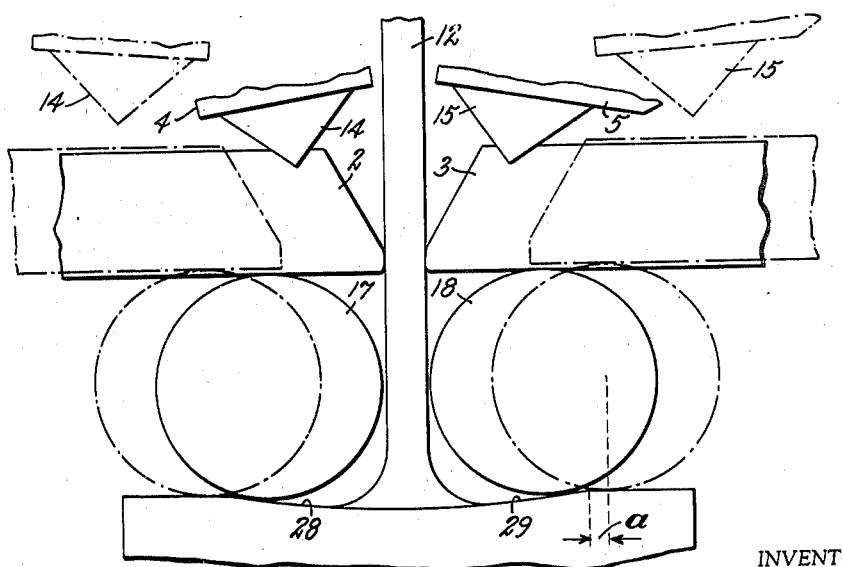

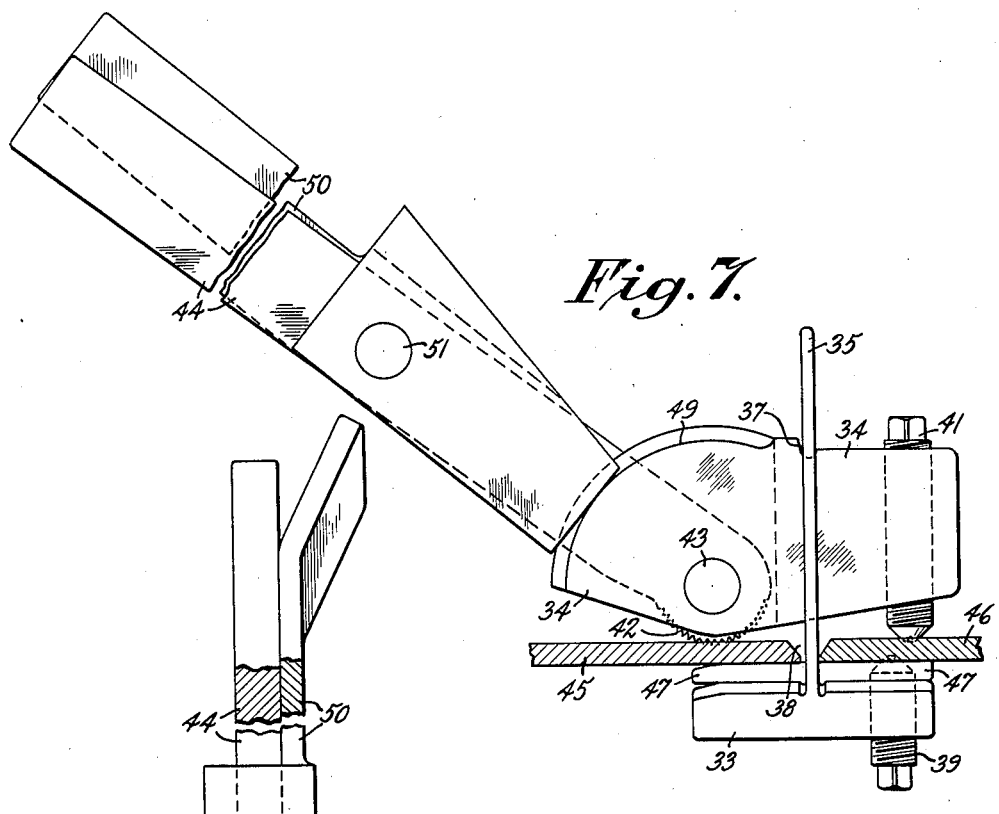
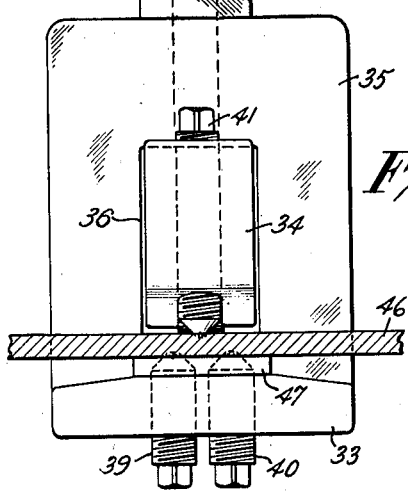

Patented May 18, 1937

2,080,563

UNITED STATES PATENT OFFICE 2,080,563

ARRANGEMENT FOR FIXATION OF THE EDGES OF A JOINT TO BE WELDED

Sven August Eskilson, Stockholm, Anders Rudolf Gunnert, Lidingo, and Knut Gustaf Ernfrid Hübinette, Stockholm, Sweden, assignors to American Gas Accumulator Company, Elizabeth, N. J., a corporation of New Jersey Application March 15, 1935, Serial No. 11,264
In Sweden March 27, 1934

13 Claims. (Cl. 113—99)

It is known that in the welding of metal parts thermo-tensions arise in the metal parts, which tensions cause the metal parts to approach each other or to become separated, so that during the process of welding the pre-adjusted joint gradually becomes narrower or wider. On the other hand, it is necessary in order to obtain a perfect weld and the desired shape of the finished piece that the width of the joint be kept constant. It has been proposed to use for this purpose a number of fixing tools or clamps. It has previously been the practice to place two flat irons across the joint, one of the irons under and the other iron over the joint. The lower flat iron is provided with a screw which penetrates the joint and the upper iron. By means of a wing nut or the like it has been possible to press together the flat irons so that these fix the joint vertically as well as laterally.

It might seem that such tools, by means of which the desired width of the joint is adjusted at the start, should be the most ideal ones. Such tools, are, however, suitable only for thin plate. For thicker material the forces created by the heating are so considerable that such tools necessarily would be very large and clumsy and therefore practically unsuitable for handling. In addition a too great number of fixing tools would be required in order to avoid to a satisfactory degree bulging of the welding slot between the tools. Finally, there occur in practical welding small but noticeable displacements in the longitudinal direction between the edges of the joint, which cannot be prevented by the tools that have hitherto been used.

If it is a question of welding a cylindrical weld wedges, bars, jacks etc. cannot be used. In the case of such welds it has been necessary as a rule, to resort to tack welding, and in cases where it is possible to reach the ends, pulling tools or press tools.

The present invention refers to a tool by means of which it is possible to fix the joint before starting and also to readjust it during the welding at a place that is situated close enough to the welding point to assure, that the width of the joint at the welding point remains practically the same during the welding of the whole length of the joint.

Further objects and advantages of our invention will be apparent from the following description considered in connection with the accompanying drawings, which form part of this specification, and of which:

Fig. 1 is a side view of one embodiment of our invention as used in making a circular weld between the ends of two hollow cylinders;

Fig. 2 is a top view of the device shown in Fig. 1;

Fig. 3 is an end view of one of the tools shown in Figs. 1 and 2;

Fig. 4 is a cross-sectional view of a portion of a tool similar to that shown in Fig. 3, but showing another embodiment of our invention.

Fig. 5 is a top view of the device shown in Fig. 4;

Fig. 6 is a more or less diagrammatic illustration of how the tools shown in Figs. 1 through 5 operate;

Fig. 7 is a side view of a still further embodiment of our invention; and

Fig. 8 is an end view of the tool shown in Fig. 7.

Fig. 1 shows how a cylindrical joint is fixed and welded. At certain distances clamps A are inserted in the joint before the pieces to be welded are brought close together, or the clamps may be disassembled, as explained hereinafter, and inserted from the inside after the edges are close together. Closer to the point where the welding is to be started a tool B, made in accordance with the present invention, is inserted in the same manner. Thereafter, the pieces are moved together and held in position by the clamps A, inclined pointed studs 60 engaging the pieces adjacent to the edge to be welded. In Fig. 1 the first portion of the weld is indicated by C. As the welding proceeds the tool B is moved before the welding point and by means of the tool the joint is pulled together as much as required. When the welding approached a clamp A this is removed by loosening the studs 60, whereby the saddles 61 may be removed from the yoke 62 of the clamp, and the yoke removed from the inside. Thereafter the welding is continued until the whole weld is completed.

Fig. 2 shows a joint during welding. Between the point of fusion 48 and the tacking tool the joint tends to come apart owing to the thermo-tensions. At that place the tool is inserted according to the invention. By screwing in the screw 25 the edges of the joint are pulled together.

In Fig. 3 the edges of the members, that are to be joined by welding, are indicated by 2 and 3.

The tool consists of two blocks that are arranged to engage and hold the edges of the joint while the welding is being done. One of the blocks consists of two shanks 4 and 5. Into these shanks screws 6 and 7 are threaded which are provided with wings 8 and 9 by means of which, they can be turned. The shanks 4 and 5 are provided with tongues 10 and 11, respectively. These tongues 10 and 11 engage each other and the edge of a yoke 12. This yoke 12 is provided with a recess 13 (Fig. 1) within which the tongues 10 and 11 fit. The screws 6 and 7 are provided with pointed ends 14 and 15, respectively, which bite into the edges 2 and 3 of the joint. The portion of the yoke 12 under the edges 2 and 3 of the joint is formed as a cross piece 16, forming the other block of the tool, so that the yoke thus has the shape of a T. Between the cross piece 16 and the edges 2 and 3 of the joint there are rollers 17 and 18, guided by a stirrup 19, which is secured to the cross piece 16. The rollers are pressed from each other by a spring 20 placed in a recess 21 in the cross piece 16. From the shank 4 two arms 22 and 23 extend one on each side of the shank 5. These arms are connected by means of the cross piece 24 into which a screw 25 is threaded. The screw 25 bears against a knob 26 of the shank 5. Into the other end of the screw 25 an arm 27 is inserted by means of which the screw 25 can be turned.

The tongues 10 and 11 are, as shown by the figure, constructed with such radii that in turning they pivot around the same center, that is, point 0 in the yoke 12.

The tool is used in the following way. The screw 25 is loosened sufficiently. The yoke 12 with appertaining parts is inserted into the joint from below. In the opening 13 the tongue 10 and the arms 22 and 23 of the shank 4 is inserted. The shank 5 is thereafter positioned between the arms 22 an 23, so that its tongue 11 occupies a position between the tongue 10 and the edge of the yoke 12. The edges 2 and 3 of the joint, the points 14 and 15 and the rollers 17 and 18 now occupy the position in relation to each other that is indicated with dashed-dotted lines in the Fig. 6. By adjustment of the screws 6 and 7 any desired height of the points in relation to the edges of the plate may be obtained. This height should be such that there is a certain play between the points 14, 15 and the edges 2, 3 of the joint, in order that it be possible to move the tool along the joint with the points 14, 15 in this extreme position. At the same time the distance must be small enough so that the tongues 10, 11 remain engaged in each other and do not come apart. When the screw 25 is screwed in the points 14, 15, move towards each other on a circular arc the centre of which is at O. The screw 25 is screwed in until the points 14, 15 touch the edges 2, 3 of the joint. The edges 2, 3 of the joint rest on the rollers 17, 18 and thus roll on these rollers when being brought together. If the supporting surfaces 28 and 29, respectively, of the rollers are plane or have a sufficiently large radius the points 14, 15 will penetrate a certain distance into the edges of the joint. This distance can be determined by suitably shaping the surfaces 28 and 29. For instance, these surfaces may be plane for a short distance $a$, sufficiently long to allow the points 14, 15 to penetrate to a predetermined depth into the edges of the joint. The radius of the surfaces 28 and 29 may thereafter be made such that the points will penetrate further or that they will remain at a constant depth.

When the screw 25 is being screwed in the points 14 and 15 first penetrate into the edges 2 and 3 of the joint and then move these edges towards each other. When this is taking place the rollers 17, 18 overcome the resistance of the spring 20. The edges of the joint may be pulled together until they press against the yoke 12.

If the force required to move the edges is so great that the points 14 and 15 tend to tear the material, the rollers then stop, and the points bite deeper into the material and further tearing is avoided.

Figs. 4 and 5 show another embodiment of the tool. The shank 5 is provided with ears 30 and 31 which enclose a head 32 of the screw 25. Thus, when the screw 25 is being screwed out it carries the shank 5 with it. This facilitates the loosening of the tool and the removal of same. The tool in this case also serves to separate the edges of the joint.

As mentioned above, the fact that it is only necessary to turn one single screw in order to adjust the edges of the joint or to loosen the tool for removal, is a great advantage. It is only when the tool is to be used for plates of a different thickness that the screws 6 and 7 need to be adjusted. It is further of great importance that the tool is constructed in such a way that it can be removed through the joint. If the screw 25 is screwed out sufficiently the tongues 10 and 11 may be turned until they are disengaged and the parts 4 and 5 may be removed. The yoke 12 with the cross piece 16 and the rollers then remain. As the yoke consists of thin strip of plate it can be pulled down through the joint and thus removed. Obviously, it may be inserted in the same manner if the edges of the joint, before welding, are so close together as to prevent the insertion of the assembled tool.

The moving of the tool along the joint is carried out in the following way: The screw 25 is screwed out so far that the points 14 and 15 just become disengaged from the edges 2 and 3. The wings 8 and 9 are then pressed towards each other by the hand. The tool can then easily be moved by one hand.

It has been found in practical work with tools of the kind described above that the effecting of movement of the edges of the joint by turning a screw results in a very good precision, but on the other hand, this manner is difficult to carry into effect because the welder has to handle the tool with one hand and adjust the feeding speed of the welding machine with the other hand. Practically all welding machines are equipped for adjustment by means of levers that are moved back and forth according to the desired speed of feeding, the desired speed of supplying filling-in material, or the like. It is also a known fact that for simultaneous adjustment of one condition by the left hand and of another condition by the right hand the reflex movements cause the adjusting movements to be very uneven if the movements are very unlike each other. In order to obtain as even adjusting movements as possible from one and the same welder it is thus necessary to provide the fixing tool with an adjusting lever of practically the same size and direction of movement as the adjusting levers of ordinary welding machines.

A tool which makes it possible to obtain a reliable and steady fixation of the edges of the joint at a correct distance from each other by means of a lever that can be moved transversely to the joint is shown in Figs. 7 and 8. Fig. 7 shows the tool from the side while Fig. 8 shows the tool seen transversely to the longitudinal direction of the joint.

Also in this embodiment the tool consists of two blocks situated one on each side of the plates to be joined by welding. The blocks are on the drawings indicated by 33 and 34. They are held together by a strip or member 35, inserted through the joint, the said member being rigidly fixed to the block 33. In the member there is an opening 36 through which the upper block can be inserted in such a way that the upper edge of the opening 36 pivotally engages a groove 37 in the upper surface of the block 34. The block 34 can thus be pivoted in the vertical plane around an axis that is parallel to the joint 38.

One or several screws 39 and 40 for fixation of the tool are arranged in the lower block, and one or several screws 41 are arranged in the upper block. The last mentioned screws are all located in one of the halves of the upper block, while the other half of the upper block is provided with a grooved or toothed wheel 42, that can be turned around a shaft 43 at such a distance from the plate to be welded that the teeth engage the plate. The wheel 42 may advantageously be shaped as an incomplete wheel formed by one end of a lever 44 in such a way that by turning the lever around the shaft 43, the teeth of the wheel 42 engage the plate 45 and force this plate closer to or away from the opposite plate 46, which latter is rigidly fixed to the tool by means of the screws 39, 40 and 41. The width of the joint 38 is hereby altered.

A tool of the kind in question should necessarily be constructed in such a way that it can be used for plates of different thicknesses. The simplest way to arrange this is by placing distance pieces 47 between the plate that is to be welded and the lower block 33. These distance pieces should be shaped in such a way that there is free space for the screws 39 and 40, and they may therefore be shaped as horseshoes or they may be provided with holes for these screws. The former shape is to be preferred as it makes it easier to exchange the distance piece by pushing it in or out from the side.

It is further necessary that it be possible to lock the lever in position of one single operation by the hand. This is necessary for the reason that the edges of the joint as a rule are elastic so that when the width of the joint is being altered a stress is developed that tends to bring the edges back to their original position. In order to allow locking of the tool in the adjusted position the upper block 34 is provided with a cam disc 49 concentrically arranged around the shaft 43. Against this cam disc the end of another lever 50 presses. The lever 50 is secured to the lever 44 by means of a bolt 51 in such a way that the lever 50 can be turned. The end of the lever 50 that is turned towards the tool is of such a length that the cam disc 49 moves freely in relation to the end surface of the lever when the two levers occupy parallel positions. When the lever 50 is turned round the bolt 51 in relation to the lever 44 the end surface of the lever 50 comes into a slanting position to the cam surface 49, so that these two parts become jammed in relation to each other, and the tool is locked in the desired position.

The invention is naturally not restricted to the embodiment shown but modifications may be made without deviating from the principle of the invention.

We claim:

1. In a tool for fixing the relative positions of two pieces to be welded together, a shank member insertable between the edges of said pieces, means secured to one end of said shank member and engageable with said pieces on one side thereof, a plurality of members movably secured to the other end of said shank member, one of the last mentioned members being engageable with one of said pieces and another being engageable with the other of said pieces, and means for moving said last mentioned members with respect to each other for adjusting the space between said edges.

2. In a tool for fixing the relative positions of two pieces to be welded together, a shank member insertable between the edges of said pieces, a work engaging member secured to one end of said shank member and engageable with said pieces on one side thereof, a plurality of work engaging members movably secured to the other end of said shank member, one of the last mentioned members being engageable with one of said pieces and the other being engageable with the other of said pieces, means for moving said last mentioned members with respect to each other for adjusting the space between said edges, and means for varying the distance between the work engaging member secured to one end of said shank member and the work engaging members secured to the other end to accommodate pieces of different thicknesses.

3. In a tool for fixing the relative positions of two pieces to be welded together, a shank member insertable between the edges of said pieces, means secured to one end of said shank member and engageable with said pieces on one side thereof, a plurality of members movably secured to the other end of said shank member, one of the last mentioned members being engageable with one of said pieces and another being engageable with the other of said pieces, and a stud having threaded engagement with one of said last mentioned members and bearing against the other for moving said last mentioned members with respect to each other for adjusting the space between said members.

4. In a tool for fixing the relative positions of two pieces to be welded together, a shank member insertable between the edges of said pieces, means secured to one end of said shank member and engageable with said pieces on one side thereof, a plurality of members held by the other end of said shank member and both pivotal about a single center, one of said last mentioned members being engageable with one of said pieces and the other being engageable with the other of said pieces, and means for pivoting said last mentioned members with respect to each other and to said shank for adjusting the space between said edges.

5. In a tool for fixing the relative positions of two pieces to be welded together, a shank member insertable between the edges of said pieces, rollers supported by one end of said shank member and engageable with said pieces on one side thereof, a plurality of members movably secured to the other end of said shank member, one of the last mentioned members being engageable with one of said pieces and another being engageable with the other of said pieces, and means for moving said last mentioned members with respect to each other, whereby said pieces roll on said rollers to adjust the space between said edges.

6. In a tool for fixing the relative positions of two pieces to be welded together, a shank member insertable between the edges of said pieces, means secured to one end of said shank member and provided with a surface substantially parallel to said pieces, a stirrup carried by said means, a pair of parallel rollers supported by said surface and retained thereon by said stirrup, resilient means tending to move said rollers apart, said rollers being engageable with said pieces on one side thereof, and means secured to the other end of said shank member and engageable with said pieces on the other side thereof for moving said pieces with respect to each other on said rollers to vary the space between said edges.

7. In a tool for fixing the relative positions of two pieces to be welded together, a shank member insertable between the edges of said pieces, means secured to one end of said shank member and provided with a surface substantially parallel to said pieces, parallel rollers supported on said surface and engageable with said pieces on one side thereof, a pair of members held by the other end of said shank member and both pivoted about a single center, the central portion of said surface being curved about said center, one of said pair of members being engageable with one of said pieces and the other being engageable with the other of said pieces, and means for pivoting said pair of members with respect to each other and to said shank member for moving said pieces with respect to each other on said rollers to vary the space between said edges, said rollers rolling on said curved surface.

8. In a tool for fixing the relative positions of two pieces to be welded together, a shank member insertable between the edges of said pieces, means secured to one end of said shank member and engageable with said pieces on one side thereof, a pair of members secured to said shank on the other side of said pieces, one member of said pair being fixed with respect to said shank and engaging one of said pieces, the other of said pair being rotatably mounted with respect to said one member and having a curved surface engageable with the other of said pieces, and a lever for turning the rotatably mounted member to move the edges of said pieces either toward or away from each other.

9. In a tool for fixing the relative positions of two pieces to be welded together, a shank member insertable between the edges of said pieces, means secured to one end of said shank member and engageable with said pieces on one side thereof, a pair of members secured to said shank on the other side of said pieces, one member of said pair being fixed with respect to said shank and engaging one of said pieces, the other of said pair comprising a lever pivotally mounted on said one member and having a curved end engageable with the other of said pieces, whereby pivotal movement of said lever adjusts the distance between the edges of said pieces.

10. In a tool for fixing the relative positions of two pieces to be welded together, a shank member insertable between the edges of said pieces, means secured to one end of said shank and engageable with said pieces on one side thereof, said means including a removable shim for accommodating pieces of different thicknesses, a pair of members held by said shank on the other side of said pieces, one member of said pair engaging one of said pieces and being movable with respect to the other member of said pair, said other member engaging the other of said pieces, and means for moving said pair of members with respect to each other for adjusting the space between said edges.

11. In a tool for fixing the relative positions of two pieces to be welded together, a shank member insertable between the edges of said pieces, means secured to one end of said shank and engageable with said pieces on one side thereof, said means including a pointed stud engageable with one of said pieces and a removable shim engageable with both of said pieces, said shim being U-shaped to facilitate insertion and removable around said stud, a pair of members held by said shank on the other side of said pieces, one member of said pair engaging one of said pieces and being movable with respect to the other member of said pair, said other member engaging the other of said pieces, and means for moving said pair of members with respect to each other for adjusting the space between said edges.

12. In a tool for fixing the relative positions of two pieces to be welded together, a shank member insertable between the edges of said pieces, means secured to one end of said shank member and engageable with said pieces on one side thereof, a pair of members secured to said shank on the other side of said pieces, one member of said pair being fixed with respect to said shank and engaging one of said pieces, the other of said pair being rotatably mounted with respect to said one member and having a curved surface engageable with the other of said pieces, a lever for turning the rotatably mounted member to move the edges of said pieces either toward or away from each other, and means for locking said lever.

13. In a tool for fixing the relative positions of two pieces to be welded together, a shank member insertable between the edges of said pieces, means secured to one end of said shank member and engageable with said pieces on one side thereof, a pair of members secured to said shank on the other side of said pieces, one member of said pair being fixed with respect to said shank and engaging one of said pieces, the other of said pair being rotatably mounted with respect to said one member and having a curved surface engageable with the other of said pieces, a lever for turning the rotatably mounted member to move the edges of said pieces either toward or away from each other, and means for locking said lever, said last mentioned means including a curved surface concentric with the axis of rotation of said rotatably mounted member, and a second lever pivotably mounted on the first mentioned lever and having an end pivotal into frictional engagement with said curved surface.

SVEN AUGUST ESKILSON.
ANDERS RUDOLF GUNNERT.
KNUT GUSTAF ERNFRID HÜBINETTE.